United States Patent
Engelfried et al.

(10) Patent No.: US 9,789,625 B2
(45) Date of Patent: Oct. 17, 2017

(54) SEPARATING DEVICE FOR A MACHINE TOOL

(71) Applicant: Robert Bosch GmbH, Stuttgart (DE)

(72) Inventors: Uwe Engelfried, Ostfildern (DE); Petr Grulich, Kirchheim/Teck (DE)

(73) Assignee: Robert Bosch GmbH, Stuttgart (DE)

( * ) Notice: Subject to any disclaimer, the term of this patent is extended or adjusted under 35 U.S.C. 154(b) by 171 days.

(21) Appl. No.: 14/410,074

(22) PCT Filed: Jun. 17, 2013

(86) PCT No.: PCT/EP2013/062540
§ 371 (c)(1),
(2) Date: Dec. 20, 2014

(87) PCT Pub. No.: WO2014/001131
PCT Pub. Date: Jan. 3, 2014

(65) Prior Publication Data
US 2015/0321378 A1    Nov. 12, 2015

(30) Foreign Application Priority Data

Jun. 28, 2012   (DE) .................. 10 2012 211 085
Aug. 31, 2012   (DE) .................. 10 2012 215 461

(51) Int. Cl.
*B27B 17/14*   (2006.01)
*B23D 57/02*   (2006.01)

(52) U.S. Cl.
CPC ............ *B27B 17/14* (2013.01); *B23D 57/023* (2013.01)

(58) Field of Classification Search
CPC .............................. B27B 17/14; B23D 57/023
USPC ............................................................ 30/385
See application file for complete search history.

(56) References Cited

U.S. PATENT DOCUMENTS

| | | | | |
|---|---|---|---|---|
| 2,532,981 A | * | 12/1950 | Wolfe | B27B 17/02 267/182 |
| 4,316,327 A | * | 2/1982 | Scott | B27B 17/14 30/386 |
| 4,382,334 A | | 5/1983 | Reynolds | |
| 4,486,953 A | * | 12/1984 | Halverson | B27B 17/02 30/385 |

(Continued)

FOREIGN PATENT DOCUMENTS

| CH | 301514 | 9/1954 |
|---|---|---|
| CN | 2776607 Y | 5/2006 |

(Continued)

OTHER PUBLICATIONS

International Search Report corresponding to PCT Application No. PCT/EP2013/062540, mailed Oct. 2, 2013 (German and English language document) (7 pages).

*Primary Examiner* — Hwei C Payer
(74) *Attorney, Agent, or Firm* — Maginot, Moore & Beck LLP (57) ABSTRACT

A separating device for a machine tool includes at least one cutting strand and at least one guide unit configured to guide the cutting strand. The guide unit forms a closed system together with the cutting strand. The separating device further includes at least one cutting strand tensioning unit that is positioned on the guide unit, and that is configured to compensate for at least one of play and tolerance in the cutting strand.

14 Claims, 5 Drawing Sheets

(56) References Cited

U.S. PATENT DOCUMENTS

| | | | | |
|---|---|---|---|---|
| 4,819,335 | A * | 4/1989 | Alexander | B27B 17/14 30/122 |
| 5,528,835 | A * | 6/1996 | Ra | B27B 17/14 30/383 |
| 6,564,459 | B1 * | 5/2003 | Steinbrueck | B27B 17/14 30/369 |
| 6,694,623 | B1 | 2/2004 | Haughey | |
| 6,694,632 | B1 | 2/2004 | Schooley | |
| 7,185,437 | B2 * | 3/2007 | Behbahany | B27B 17/14 30/381 |
| 2015/0321378 | A1 * | 11/2015 | Engelfried | B23D 57/023 30/383 |

FOREIGN PATENT DOCUMENTS

| | | |
|---|---|---|
| CN | 201279808 Y | 7/2009 |
| CN | 101670596 A | 3/2010 |
| DE | 197 46 891 A1 | 4/1998 |
| GB | 2 042 974 A | 10/1980 |
| WO | 2010/105809 A1 | 9/2010 |

* cited by examiner

SEPARATING DEVICE FOR A MACHINE TOOL

This application is a 35 U.S.C. §371 National Stage Application of PCT/EP2013/062540, filed on Jun. 17, 2013, which claims the benefit of priority to Serial Nos. DE 10 2012 211 085.2 filed on Jun. 28, 2012 and DE 10 2012 215 461.2 filed on Aug. 31, 2012 in Germany, the disclosures of which are incorporated herein by reference in their entirety.

BACKGROUND

There are already known power-tool parting devices that have a cutting strand, and that have a guide unit for guiding the cutting strand, the guide unit in combination with the cutting strand forming a closed system.

SUMMARY

The disclosure is based on a power-tool parting device, in particular a hand power-tool parting device, having at least one cutting strand, and having at least one guide unit, for guiding the cutting strand, that, in combination with the cutting strand, forms a closed system.

It is proposed that the power-tool parting device comprise at least one cutting-strand tensioning unit, which is disposed on the guide unit and which is provided for compensating play and/or tolerance of the cutting strand. A "cutting strand" is to be understood here to mean, in particular, a unit provided to locally undo an atomic coherence of a workpiece on which work is to be performed, in particular by means of a mechanical parting-off and/or by means of a mechanical removal of material particles of the workpiece. Preferably, the cutting strand is provided to separate the workpiece into at least two parts that are physically separate from each other, and/or to part off and/or remove, at least partially, material particles of the workpiece, starting from a surface of the workpiece. Particularly preferably, the cutting strand is moved in a revolving manner, in particular along a circumferential direction of a guide unit of the power-tool parting device, in at least one operating state. Particularly preferably, the cutting strand is realized as a cutting chain. It is also conceivable, however, for the cutting strand to be of another design, considered appropriate by persons skilled in the art, such as, for example, designed as a cutting band, on which a plurality of cutting strand segments of the cutting strand are disposed. Preferably, the cutting strand, as viewed along a direction that is at least substantially perpendicular to a cutting plane of the cutting strand, has a maximum dimension of less than 4 mm. Preferably, the dimension is realized as the width of the cutting strand. Particularly preferably, the cutting strand, as viewed along the direction that is at least substantially perpendicular to the cutting plane of the cutting strand, has a maximum dimension that is at least substantially constant along a total length of the cutting strand. Preferably, along the total length of the cutting strand, the maximum dimension corresponds to a value from a value range of from 1 mm to 3 mm. Consequently, the power-tool parting device, as viewed along a total extent of the power-tool parting device, has a total width of less than 4 mm. The cutting strand is thus preferably provided to produce a cut that has a maximum dimension of less than 4 mm, as viewed along the direction that is at least substantially perpendicular to the cutting plane of the cutting strand.

Preferably, the cutting strand segments each comprised at least one cut-depth limiting element. The term "cut-depth limiting element" is intended here to define, in particular, an element by which, while work is being performed on a workpiece, penetration of the cutting element of a cutting strand segment into the workpiece is limited to a maximum value, in particular during removal of at least one workpiece chip, and thus defines a maximum chip thickness of a workpiece chip removed. The cut-depth limiting element, as viewed along a cutting direction of the cutting element, is preferably disposed after the cutting element, on a cutter carrier element of the respective cutting strand segment. It is also conceivable, however, for the cut-depth limiting element to be disposed at another position on the cutter carrier element, considered appropriate by persons skilled in the art, such as, for example, before and after the cutting element, beside the cutting element, etc., as viewed along the cutting direction of the cutting element.

A "guide unit" is to be understood here to mean, in particular, a unit provided to exert a constraining force upon the cutting strand, at least along a direction perpendicular to a cutting direction of the cutting strand, in order to define a movement capability of the cutting strand along the cutting direction. Preferably, the guide unit has at least one guide element, in particular a guide groove, by which the cutting strand is guided. Preferably, the cutting strand, as viewed in a cutting plane of the cutting strand, is guided by the guide unit along an entire circumference of the guide unit, by means of the guide element, in particular the guide groove. A "cutting direction" is to be understood here to mean, in particular, a direction along which the cutting strand is moved, in particular in the guide unit, for the purpose of producing a cutting gap and/or parting-off and/or removing workpiece particles of a workpiece on which work is to be performed, in at least one operating state, as the result of a driving force and/or a drive torque. The expression "provided" is intended here to define, in particular, specially designed and/or specially equipped.

The term "closed system" is intended here to define, in particular, a system comprising at least two components that, by means of combined action, when the system has been demounted from a system that is of a higher order than the system, such as, for example, a portable power tool, maintain a functionality and/or are inseparably connected to each other when in the demounted state. Preferably, the at least two components of the closed system are connected to each other so as to be at least substantially inseparable by an operator. "At least substantially inseparable" is to be understood here to mean, in particular, a connection of at least two components that can be separated from each other only with the aid of parting tools such as, for example, a saw, in particular a mechanical saw, etc. and/or chemical parting means such as, for example, solvents, etc. The expression "cutting-strand tensioning unit" is intended here to define, in particular, a unit provided to exert a tensioning force upon the cutting strand for the purpose of compensating play and/or tolerance resulting from manufacture, in at least one state, in particular when the guide unit is coupled to a coupling device of the power tool. The cutting strand is thus preferably tensioned, or pretensioned by means of the cutting-strand tensioning unit. The design of the power-tool parting device makes it possible, advantageously, to compensate manufacture tolerance. Moreover, advantageously, it is possible to compensate play of the cutting strand relative to the guide unit, thereby enabling the cutting strand to be guided in a particularly precise manner by means of the guide unit.

Furthermore, it is proposed that the cutting-strand tensioning unit comprise at least one cutting-strand holding element, which is provided to hold the cutting strand in at least one coupling position. A "cutting-strand holding element" is to be understood here to mean, in particular, an element that holds the cutting strand, on a drive side of the guide unit, at least substantially in a coupling position of the cutting strand, when the power-tool parting device, in particular the guide unit, has been demounted from a coupling device of the portable power tool. In particular, in the case of power-tool parting device realized separately from a torque transmission element disposed in the guide unit, the cutting strand is held in a coupling position of the cutting strand by means of the cutting-strand holding unit, on a drive side of the guide unit, when the power-tool parting device, in particular the guide unit, has been demounted from the coupling device. A "drive side" is to be understood here to mean, in particular, a side of the guide unit on which a drive element of the portable power tool can be coupled to the cutting strand and/or to a torque transmission element of the power-tool parting device, and, in particular, engages in the guide unit, for the purpose of transmitting driving forces and/or drive torques to the cutting strand when the power-tool parting device, in particular the guide unit, has been connected to the coupling device. The term "coupling position" is intended here to define, in particular, a position of the cutting strand in which, in the case of coupling of the power-tool parting device, in particular the guide unit, to the coupling device of the portable power tool, the cutting strand can be directly connected to the drive element of the portable power tool and/or the cutting strand is in engagement with the torque transmission element, which can be directly coupled to the drive element. Preferably, when the cutting strand is in the coupling position, the drive element can be inserted in the guide unit, while the cutting strand can be coupled to the drive element without the cutting strand being held by an operator. As a result, advantageously, the power-tool parting device, in particular the guide unit, can be mounted on the coupling device in a simple, convenient manner, advantageously avoiding the need for an operator to hold the cutting strand in order to couple the drive element to the cutting strand.

Advantageously, the cutting-strand holding element is realized in the shape of a disk. "In the shape of a disk" is to be understood here to mean, in particular, a geometric design of an element having an extent, in particular a thickness, or a height, along at least one first direction, that is many times less than another extent of the element, in particular a width, or a diameter, along another direction that is at least substantially parallel to the first direction. It is also conceivable, however, for the cutting-strand holding element to be of another design, considered appropriate by persons skilled in the art. Preferably, the cutting-strand holding element is provided to hold the cutting strand in at least one position, in particular the coupling position, by means of a form-closed connection, in particular by means of a face of the cutting-strand holding element. It is also conceivable, however, for the cutting-strand holding element to hold the cutting strand in at least one position by another means, considered appropriate by persons skilled in the art, such as, for example, by means of a magnetic force, etc. Advantageously, the cutting strand can be prevented from falling into a coupling recess of the guide unit. Advantageously, the design according to the disclosure makes it possible to achieve a compact cutting-strand holding element.

Moreover, it is proposed that the cutting-strand tensioning unit be movably mounted on the guide unit. The expression "movably mounted" is intended here to define, in particular, a mounting of a unit and/or of an element relative to at least one other unit and/or one other element, the unit and/or the element, in particular dissociated from an elastic deformation of the unit and/or element, and dissociated from movement capabilities caused by a bearing play, having a capability to move along at least one axis, along a distance greater than 1 mm, preferably greater than 10 mm, and particularly preferably greater than 20 mm, and/or having a capability to move about at least one axis by an angle greater than 10°, preferably greater than 45°, and particularly preferably greater than 60°. Particularly preferably, the cutting-strand tensioning unit is mounted on the guide unit so as to be translationally movable relative to the guide unit. It is also conceivable, however, for the cutting-strand tensioning unit to be mounted on the guide unit so as to be rotationally relative to the guide unit. Advantageously, the design of the power-tool parting device is such that the cutting strand is easy to retension.

It is additionally proposed that the guide unit have at least one bearing recess, in which at least one bearing element of the cutting-strand tensioning unit engages. Preferably, the bearing element is realized as a bearing stud, which engages in the bearing recess and is fixed to a main body element of the cutting-strand tensioning unit. It is also conceivable, however, for the bearing element to be of another design, considered appropriate by persons skilled in the art, such as, for example, designed as a guide rib, etc. Advantageously, the design according to the disclosure enables the cutting-strand tensioning unit to be disposed on the guide unit. Moreover, by simple design means, the cutting-strand tensioning unit can be movably mounted on the guide unit.

Particularly preferably, the bearing recess is realized as an oblong hole. It is also conceivable, however, for the bearing recess to be of another design, considered appropriate by persons skilled in the art, such as, for example, designed as a groove, etc. The design as an oblong hole makes it possible, by simple design means, to render the cutting-strand tensioning unit capable of moving relative to the guide unit for the purpose of compensating play and/or tolerance of the cutting strand.

Furthermore, it is proposed that the cutting-strand tensioning unit have at least one adjusting element, which is provided to set at least one position of the movably mounted cutting-strand tensioning unit relative to the guide unit. Preferably, the adjusting element is movably mounted. The adjusting element in this case may be realized as a setscrew, as a setting lever, or as another adjusting element considered appropriate by persons skilled in the art. The adjusting element can preferably be operated directly by an operator. Thus, advantageously, an operator can retension the cutting strand by actuating the adjusting element.

It is additionally proposed that the power-tool parting device comprise at least one torque transmission element, which is mounted so as to be translationally movable relative to the guide unit, by means of the cutting-strand tensioning unit. The torque transmission element preferably engages in the cutting strand for the purpose of driving the cutting strand. Particularly preferably, the torque transmission element is mounted so as to be translationally movable relative to the guide unit, by means of the cutting-strand tensioning unit. It is also conceivable, however, for the torque transmission element to be mounted so as to be rotationally movable relative to the guide unit, by means of the cutting-strand tensioning unit. The design according to the disclosure makes it possible, advantageously, to achieve a compact power-tool parting device comprising, mounted on the guide unit, a torque transmission element that is movably mounted for the purpose of compensating play and/or tolerance. Thus, advantageously, a long service life can be achieved for the power-tool parting device, since it is possible to retension the cutting strand by means of the torque transmission element and by means of the cutting-strand tensioning unit.

The disclosure is also based on the portable power tool comprising the coupling device for coupling, in a form-closed and/or force-closed manner, to the power-tool parting device according to the disclosure. A "portable power tool" is to be understood here to mean, in particular, a power tool, in particular a hand power tool, that can be transported by an operator without the use of a transport machine. The portable power tool has, in particular, a mass of less than 40 kg, preferably less than 10 kg, and particularly preferably less than 5 kg. The design of the power-tool parting device makes it possible to achieve guiding of the cutting strand, by simple design means. Particularly preferably, the power-tool parting device according to the disclosure and the portable power tool according to the disclosure form a power tool system. Advantageously, it is possible to achieve a portable power tool that, particularly advantageously, is suitable for a broad spectrum of application.

The power-tool parting device according to the disclosure, the portable power tool according to the disclosure and/or the power tool system according to the disclosure is/are not intended in this case to be limited to the application and embodiment described above. In particular, the power-tool parting device according to the disclosure, the portable power tool according to the disclosure and/or the power tool system according to the disclosure may have individual elements, components and units that differ in number from a number stated herein, in order to fulfill a principle of function described herein.

BRIEF DESCRIPTION OF THE DRAWINGS

Further advantages are given by the following description of the drawing. The drawing shows exemplary embodiments of the disclosure. The drawing, the description and the claims contain numerous features in combination. Persons skilled in the art will also expediently consider the features individually and combine them to create appropriate further combinations.

There are shown in the drawing.

DETAILED DESCRIPTION

Figure 1:
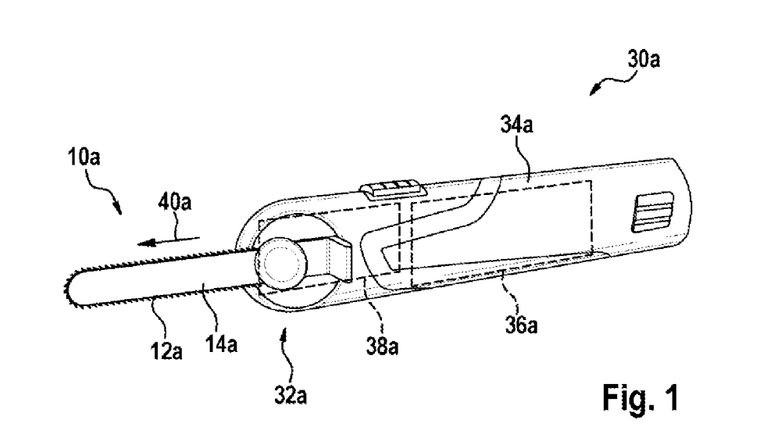
FIG. 1 a portable power tool according to the disclosure having a power-tool parting device according to the disclosure, in a schematic representation, FIG. 2 a detail view of the power-tool parting device according to the disclosure, in a schematic representation, FIG. 3 a sectional view of the power-tool parting device according to the disclosure, along the line III-III from FIG. 2, in a schematic representation, FIG. 4 a detail view of a cutting-strand tensioning unit of the power-tool parting device according to the disclosure, in a schematic representation, FIG. 5 a detail view of an alternative power-tool parting device according to the disclosure, in a schematic representation, FIG. 6 a detail view of a further, alternative power-tool parting device according to the disclosure in a pretensioning device, in a schematic representation, FIG. 7 a detail view of a further, alternative power-tool parting device according to the disclosure, in a schematic representation, FIG. 8 a sectional view of the power-tool parting device according to the disclosure from FIG. 7, in a schematic representation, FIG. 9 a detail view of a further, alternative power-tool parting device according to the disclosure, in a schematic representation, and FIG. 10 an exploded detail view of the power-tool parting device from FIG. 9, in a schematic representation.

FIG. 1 shows a portable power tool 30a comprising a power-tool parting device 10a, which together form a power tool system. The power-tool parting device 10a comprises at least one cutting strand 12a and at least one guide unit 14a for guiding the cutting strand 12a. The guide unit 14a in combination with the cutting strand 12a forms a closed system. The portable power tool 30a additionally has a coupling device 32a for coupling the power-tool parting device 10a in a form-closed and/or force-closed manner. The coupling device 32a in this case may be realized as a bayonet closure and/or as another coupling device, considered appropriate by persons skilled in the art.

The portable power tool 30a additionally has a power tool housing 34a, which encloses a drive unit 36a and a transmission unit 38a of the portable power tool 30a. The drive unit 36a and the transmission unit 38a are operatively connected to each other for the purpose of generating a drive torque that can be transmitted to the power-tool parting device 10a, in a manner already known to persons skilled in the art. The transmission unit 38a is realized as a bevel gear transmission. The drive unit 36a is realized as an electric motor unit. It is also conceivable, however, for the drive unit 36a and/or the transmission unit 38a to be of a different design, considered appropriate by persons skilled in the art, such as, for example, the transmission unit 38a being designed as a worm gear transmission, etc. The drive unit 36a is provided to drive the cutting strand 12a of the power-tool parting device 10a, in at least one operating state, via the transmission unit 38a. The cutting strand 12a in this case is moved in the guide unit 14a of the power-tool parting device 10a, along a cutting direction 40a of the cutting strand 12a in the guide unit 14a.

Figure 2:
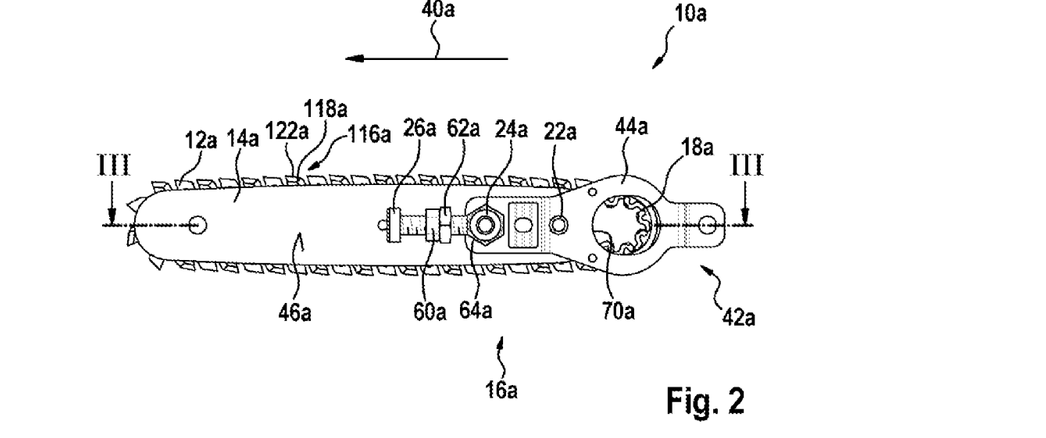

FIG. 2 shows the power-tool parting device 10a having been decoupled from the coupling device 32a of the portable power tool 30a. The power-tool parting device 10a has the cutting strand 12a and the guide unit 14a, which together form a closed system. The cutting strand 12a is guided by means of the guide unit 14a. For this purpose, the guide unit 14a has at least one guide element, realized as a guide groove (not represented in greater detail here), by means of which the cutting strand 12a is guided. The cutting strand 12a in this case is guided by means of edge regions of the guide unit 14a that delimit the guide groove. It is also conceivable, however, for the guide element to be realized in a different manner, considered appropriate by persons skilled in the art, such as, for example, as a rib-type formation on the guide unit 14a that engages in a recess on the cutting strand 12a. The cutting strand 12a additionally comprises a multiplicity of cutting strand segments 116a, which are connected to each other and form the cutting strand 12a realized as a cutting chain.

Figure 3:
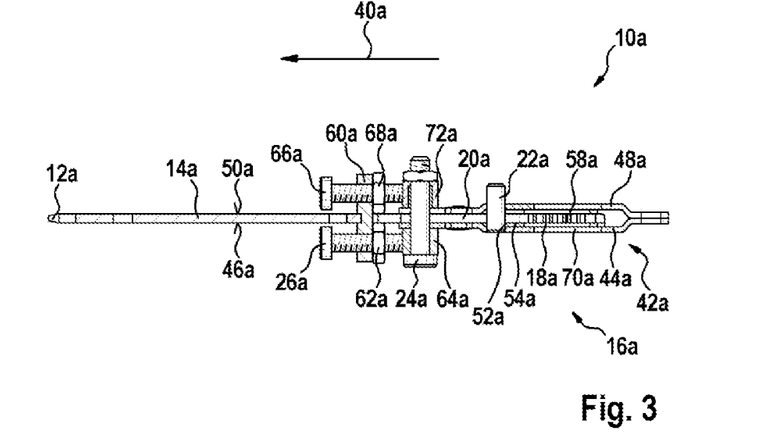
Figure 4:
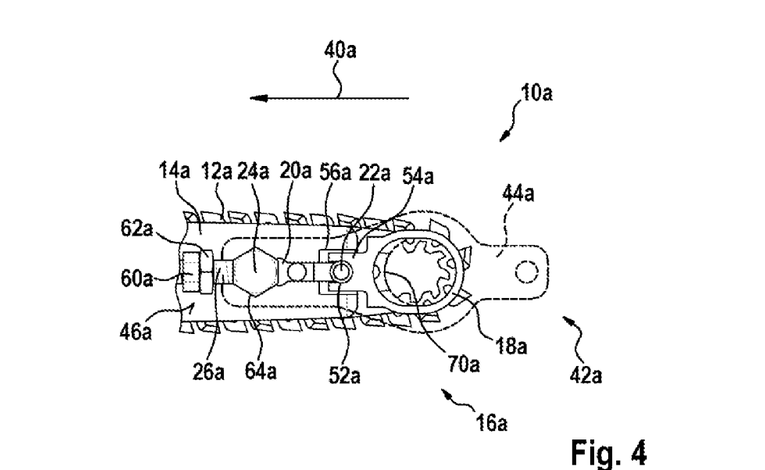

The power-tool parting device 10a additionally comprises at least one cutting-strand tensioning unit 16a, which is disposed on the guide unit 14a and provided to compensate play and/or tolerance of the cutting strand 12a. The cutting-strand tensioning unit 16a in this case is disposed, at least partially, on a drive side 42a of the guide unit 14a. The drive side 42a and, consequently, the guide unit 14a can be coupled to an output element (not represented in greater detail here) of the transmission unit 38a of the portable power tool 30a by means of the coupling device 32a. The cutting-strand tensioning unit 16a comprises at least one tensioning element 44a disposed on the guide unit 14a. The tensioning element 44a is disposed on an outer face 46a of the guide unit 14a. Moreover, the cutting-strand tensioning unit 16a comprises at least one further tensioning element 48a disposed on the guide unit 14a (FIG. 3). The further tensioning element 48a is disposed on a further outer face 50a of the guide unit 14a that is at least substantially parallel to the outer face 46a. The tensioning element 44a and the further tensioning element 48a in this case are movably mounted on the guide unit 14a. The cutting-strand tensioning unit 16a is thus movably mounted on the guide unit 14a. For this purpose, the guide unit 14a has at least one bearing recess 20a, in which at least one bearing element 22a of the cutting-strand tensioning unit 16a engages. The bearing recess 20a is realized as an oblong hole (FIG. 4). The bearing element 22a of the cutting-strand tensioning unit 16a is realized as a bearing stud. It is also conceivable, however, for the bearing element 22a to be of another design, considered appropriate by persons skilled in the art, such as, for example, designed as a stamped element, etc. For the purpose of carrying the tensioning element 44a and the further tensioning element 48a, the bearing element 22a extends through the clamping element 44a and the further clamping element 48a, at least substantially perpendicularly in relation to the outer face 46a and the further outer face 50a. The bearing element 22a is mounted, together with the tensioning element 44a and the further tensioning element 48a, in the bearing recess 20a, so as to be translationally movable relative to the guide unit 14a. The bearing element 22a in this case is mounted, together with the tensioning element 44a and the further tensioning element 48a, in the bearing recess 20a, so as to be translationally movable relative to the guide unit 14a along a direction that is at least substantially parallel to the outer face 46a and/or to the further outer face 50a.

Furthermore, the cutting-strand tensioning unit 16a comprises at least one cutting-strand holding element 18a, which is provided to hold the cutting strand 12a in at least one coupling position. The cutting-strand holding element 18a holds the cutting strand 12a in the coupling position following a tensioning operation by means of the cutting-strand tensioning unit 16a. The cutting-strand holding element 18a in this case has a guide recess 52a, in which the bearing element 22a engages (FIG. 4). The bearing element 22a is fixed in the guide recess 52a by means of a press fit. Thus, by means of the bearing element 22a, the cutting-strand holding element 18a is mounted so as to be movable relative to the guide unit 14a. It is also conceivable, however, for the bearing element 22a to be fixed in the guide recess 52a in another manner, considered appropriate by persons skilled in the art, such as, for example, by means of a stamping, a rivet heat, a collar, etc. Moreover, the cutting-strand holding element 18a has a guide extension 54a, in which the guide recess 52a is disposed. The guide extension 54a is provided to guide the cutting-strand holding element 18a translationally during a movement of the cutting-strand holding element 18a relative to the guide unit 14a. For this purpose, the guide extension 54a is disposed in a longitudinal guide recess 56a of the guide unit 14a that adjoins the bearing recess 20a (FIG. 4). The guide extension 54a is disposed in the longitudinal guide recess 56a by means of a clearance fit. The cutting-strand holding element 18a is realized in the shape of a disk. The cutting-strand tensioning unit 16a additionally has a further cutting-strand holding element 58a, which is similar in design to the cutting-strand holding element 18a. The cutting-strand holding element 18a and the further cutting-strand holding element 58a, as viewed along a direction that is at least substantially perpendicular to the outer face 46a and the further outer face 50a, are disposed between the tensioning element 44a and the further tensioning element 48a (FIG. 3).

The cutting-strand tensioning unit 16a additionally has at least one adjusting element 26a, which is provided to set at least one position of a cutting-strand holding element 18a of the cutting-strand tensioning unit 16a relative to the guide unit 14a. Moreover, the adjusting element 26a is provided to set a position of the tensioning element 44a and/or of the further tensioning element 48a relative to the guide unit 14a. The adjusting element 26a is movably mounted in a transverse extension 60a of the guide unit 14a, on the outer face 46a. The transverse extension 60a is at least substantially parallel to the outer face 46a and to the further outer face 50a of the guide unit 14a. The transverse extension 60a in this case is disposed in a fixed position on the guide unit 14a. The adjusting element 26a is realized as a setscrew, which is movably mounted by means of a threaded element 62a of the cutting-strand tensioning unit 16a that is disposed on the transverse extension 60a. It is also conceivable, however, for the threaded element 62a to be integral with the transverse extension 60a.

In addition, the adjusting element 26a is supported on a stop element 64a of the cutting-strand tensioning unit 16a. The stop element 64a in this case is disposed in a rotationally fixed manner on a further bearing element 24a of the cutting-strand tensioning unit 16a. For the purpose of movably carrying the tensioning element 44a and the further tensioning element 48a on the guide unit 14a, the further bearing element 24a extends through the bearing recess 20a and, at least substantially perpendicularly in relation to the outer face 46a and the further outer face 50a, through the tensioning element 44a and the further tensioning element 48a. The cutting-strand tensioning unit 16a additionally has at least one further adjusting element 66a, which is similar in design to the adjusting element 26a (FIG. 3). The further adjusting element 66a in this case is movably mounted in the transverse extension 60a, on the further outer face 50a of the guide unit 14a. The further adjusting element 66a in this case is movably mounted by means of a further threaded element 68a of the cutting-strand tensioning unit 16a that is disposed on the transverse extension 60a, on the further outer face 50a. In addition, the further adjusting element 66a is supported on a further stop element 72a of the cutting-strand tensioning unit 16a. The further stop element 72a is disposed in a rotationally fixed manner on the further bearing element 24a, on the further outer face 50a.

The tensioning element 44a and the further tensioning element 48a are moved, together with the cutting-strand holding element 18a and the further cutting-strand holding element 58a, relative to the guide unit 14a, as a result of the adjusting element 26a being screwed into and/or out of threaded element 62a and/or as a result of the further adjusting element 66a being screwed into and/or out of the further threaded element 68a. It is also conceivable, however, for the cutting-strand tensioning unit 16a to comprise only one adjusting element 26a, which is provided to move the tensioning element 44a and the further tensioning element 48a, together with the cutting-strand holding element 18a and the further cutting-strand holding element 58a, relative to the guide unit 14a. It is conceivable in this case for the adjusting element 26a to have a tooth system, which acts in combination with a toothed rack element of the cutting-strand tensioning unit 16a that is disposed in the bearing recess 20a, and thus to move the tensioning element 44a and the further tensioning element 48a, together with the cutting-strand holding element 18a and the further cutting-strand holding element 58a, relative to the guide unit 14a.

For the purpose of compensating play and/or tolerance of the cutting strand 12a, and/or for the purpose of tensioning the cutting strand 12a, the power-tool parting device 10a is coupled to the portable power tool 30a by the coupling device 32a. In this case, the output element of the transmission unit 38a, which is not represented in greater detail here, engages in the cutting strand 12a. An actuation of the adjusting element 26a and of the further adjusting element 66a causes the tensioning element 44a and the further tensioning element 48a, together with the cutting-strand holding element 18a and the further cutting-strand holding element 58a, to be moved relative to the guide unit 14a. A tension of the cutting strand 12a is thus altered. It is also conceivable, however, for the power-tool parting device 10a to be coupled to a pretensioning device, not represented in greater detail here, which comprises an output element that engages in the cutting strand 12a when the power-tool parting device 10a is in a coupled state. Then, likewise, the tensioning element 44a and the further tensioning element 48a, together with the cutting-strand holding element 18a and the further cutting-strand holding element 58a, can be moved relative to the guide unit 14a by an actuation of the adjusting element 26a and of the further adjusting element 66a, in order to alter a tension of the cutting strand 12a.

After the power-tool parting device 10a has been removed from the coupling device 32a, the cutting strand 12a is to a large extent prevented from falling fully into a coupling recess 70a of the cutting-strand tensioning unit 16a, by means of the cutting-strand holding element 18a and the further cutting-strand holding element 58a. In this case, when the power-tool parting device 10a has been removed from the portable power tool 30a or from the pretensioning device, cutting elements 122a of the cutting strand segments 116a of the cutting strand 12a bear with at least one point, or one line, or one face, on the cutting-strand holding element 18a and the further cutting-strand holding element 58a. Bearing of faces of the cutting elements 122a is realized as a result of the cutting elements 122a being offset relative to each other, or relative to a cutting plane of the cutting strand 12a.

Alternative exemplary embodiments are represented in FIGS. 5 to 10. Components, features and functions that remain substantially the same are denoted basically by the same references. To differentiate the exemplary embodiments, the letters a to e have been appended to the references of the exemplary embodiments. The following description is limited substantially to the differences as compared with the first exemplary embodiment described in FIGS. 1 to 4, and reference may be made to the description of the first exemplary embodiment in FIGS. 1 to 4 in respect of components, features and functions that remain the same.

Figure 5:
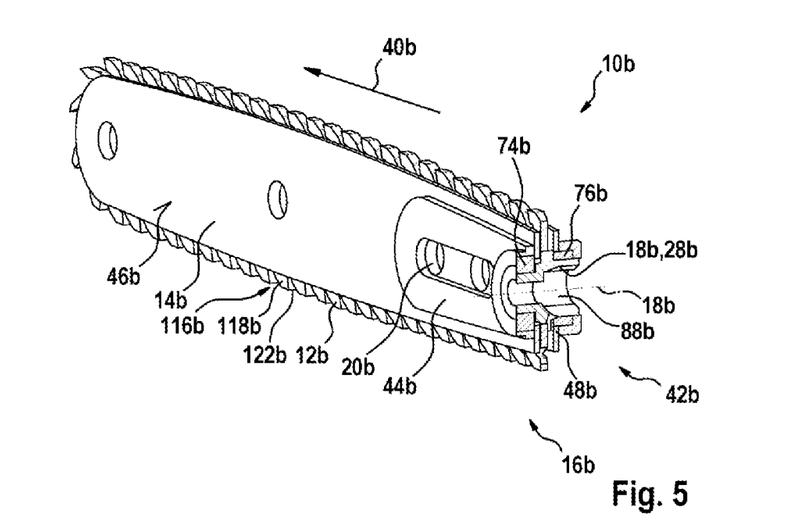

FIG. 5 shows an alternative power-tool parting device 10b, which comprises at least one cutting strand 12b, and at least one guide unit 14b for guiding the cutting strand 12b. The guide unit 14b in combination with the cutting strand 12b forms a closed system. The power-tool parting device 10b also comprises at least one cutting-strand tensioning unit 16b, which is disposed on the guide unit 14b and which is provided to compensate play and/or tolerance of the cutting strand 12b. The power-tool parting device 10b additionally comprises at least one torque transmission element 28b, which is mounted, by means of the cutting-strand tensioning unit 16b, so as to be translationally movable relative to the guide unit 14b. The torque transmission element 28b is mounted so as to be translationally movable relative to the guide unit 14b by means of a tensioning element 44b and by means of a further tensioning element 48b of the cutting-strand tensioning unit 16b. In this case, by means of rotary bearing elements 74b, 76b of the cutting-strand tensioning unit 16b, which are disposed on the tensioning element 44b and on the further tensioning element 48b, the torque transmission element 28b is additionally mounted in the cutting-strand tensioning unit 16b so as to be rotatable about a rotation axis 78b. The tensioning element 44b and the further tensioning element 48b are disposed on a drive side 42b of the guide unit 14b.

The torque transmission element 28b engages in the cutting strand 12b by means of drive teeth of the torque transmission element 28b. The torque transmission element 28b is thus realized as a cutting-strand holding element 18b of the cutting-strand tensioning unit 16b, which is provided to hold the cutting strand 12b in at least one coupling position. Moreover, the torque transmission element 28b comprises at least one drive coupling recess 88b, which is provided to act in combination with an output element of a transmission unit (not represented in greater detail here) of the portable power tool when the guide unit 14b, or the power-tool parting device 10b, has been coupled to the portable power tool (not represented in greater detail here). The tensioning element 44b and the further tensioning element 48b are mounted, so as to be translationally movable relative to the guide unit 14b, by means of adjusting elements of the cutting-strand tensioning unit 16b (the adjusting element in this case may be similar in design to the adjusting element 26a described in FIGS. 1 to 4). As a result, play and/or tolerance of the cutting strand 12b can be compensated, and/or the cutting strand 12b can be tensioned. The torque transmission element 28b is thus provided to compensate play and/or tolerance of the cutting strand 12b, and/or to tension the cutting strand 12b, by means of a movement of the tensioning element 44b and of the further tensioning element 48b relative to the guide unit 14b. It is also conceivable in this case for the tensioning element 44b and the further tensioning element 48b to be moved relative to the guide unit 14b, before a first operation of the power-tool parting device 10b, by means of a pretensioning device (not represented in greater detail here), until a desired tension of the cutting strand 12b has been set, and then to be fixed to the guide unit 14b by means of an adhesive-force connection. In respect of further features and functions of the power-tool parting device 10b, reference may be made to the power-tool parting device 10a described in FIGS. 1 to 4.

Figure 6:
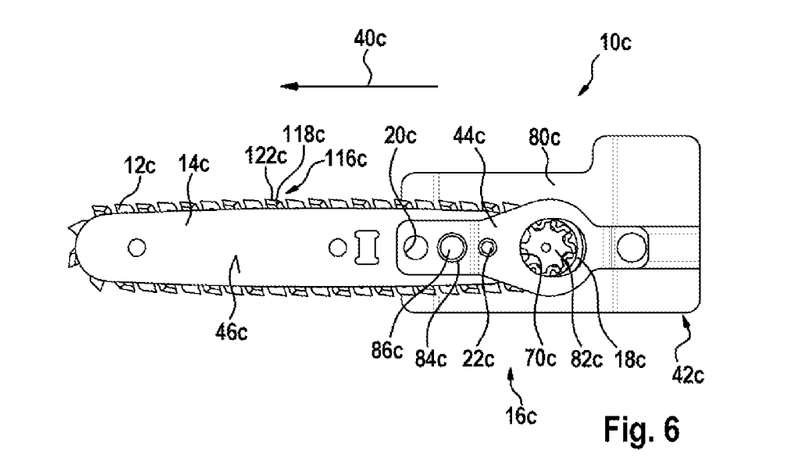

FIG. 6 shows a further, alternative power-tool parting device 10c, which comprises at least one cutting strand 12c, and at least one guide unit 14c for guiding the cutting strand 12c. The guide unit 14c in combination with the cutting strand 12c forms a closed system. The power-tool parting device 10c also comprises at least one cutting-strand tensioning unit 16c, which is disposed on the guide unit 14c and which is provided to compensate play and/or tolerance of the cutting strand 12c. The cutting-strand tensioning unit 16c comprises at least one cutting-strand holding element 18c, which is provided to hold the cutting strand 12c in at least one coupling position. In total, the cutting-strand tensioning unit 16c comprises two cutting-strand holding elements 18c, which are similar in design to the cutting-strand holding element 18a described in FIGS. 1 to 4. The cutting-strand tensioning unit 16c is thus of a design that is at least substantially similar to that of the cutting-strand tensioning unit 16a described in FIGS. 1 to 4. Unlike the cutting-strand tensioning unit 16a described in FIGS. 1 to 4, the cutting-strand tensioning unit 16c is separate from an adjusting element.

For the purpose of compensating play and/or tolerance of the cutting strand 12c and/or tensioning the cutting strand 12c, the power-tool parting device 10c is coupled to a pretensioning device 80c of power tool system that comprises the power-tool parting device 10c and a portable power tool (not represented in greater detail here). In this case, the drive element 82c of the pretensioning device 80c engages in the cutting strand 12c. The cutting-strand tensioning unit 16c is moved relative to the guide unit 14c by means of an adjusting element 86c of the pretensioning device 80c that engages in at least one adjusting recess 84c of the cutting-strand tensioning unit 16c. A tension of the cutting strand 12c is thus altered for the purpose of compensating play and/or tolerance of the cutting strand 12c in the guide unit 14c. The cutting-strand tensioning unit 16c is then connected to the guide unit 14c by form closure, force closure and/or adhesive force, by means of fixing unit of the pretensioning device 80c that is not represented in greater detail here. After the power-tool parting device 10c has been removed from the pretensioning device 80c, the cutting strand 12c is to a large extent prevented from falling fully into a coupling recess 70c of the cutting-strand tensioning unit 16c, by means of the cutting-strand holding elements 18c.

Figure 7:
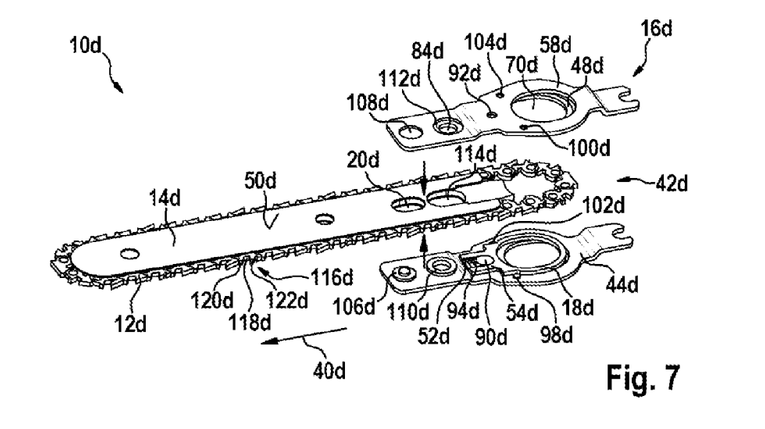
Figure 8:
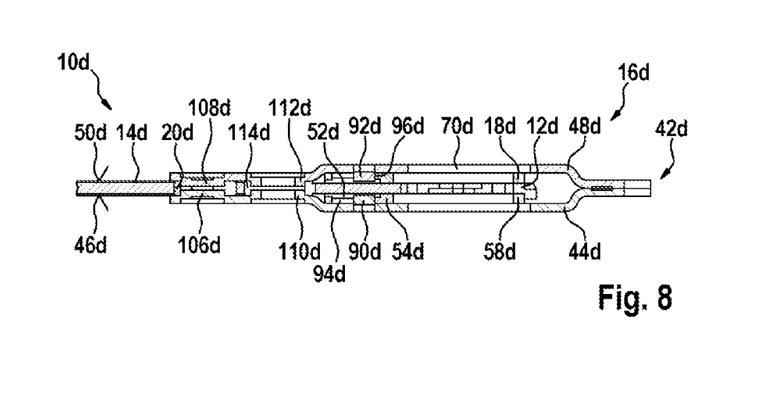

FIG. 7 shows a further, alternative power-tool parting device 10d, which comprises at least one cutting strand 12d, and at least one guide unit 14d for guiding the cutting strand 12d. The guide unit 14d in combination with the cutting strand 12d forms a closed system. The power-tool parting device 10d also comprises at least one cutting-strand tensioning unit 16d, which is disposed on the guide unit 14d and which is provided to compensate play and/or tolerance of the cutting strand 12d. The cutting-strand tensioning unit 16d comprises at least one cutting-strand holding element 18d, which is provided to hold the cutting strand 12d in at least one coupling position. The cutting-strand holding element 18d is realized in the shape of a disk. The cutting-strand tensioning unit 16d additionally has a further cutting-strand holding element 58d, which is similar in design to the cutting-strand holding element 18d. The cutting-strand holding element 18d and the further cutting-strand holding element 58d, as viewed along a direction that is at least substantially perpendicular to an outer face 46d of the guide unit 14d and to a further outer face 50d of the guide unit 14d, are disposed between a tensioning element 44d of the cutting-strand tensioning unit 16d and a further tensioning element 48d of the cutting-strand tensioning unit 16d (FIG. 8).

The tensioning element 44d and the further tensioning element 48d each have at least one form-closure connecting element 90d, 92d for form-closed connection to the cutting-strand holding element 18d and the further cutting-strand holding element 58d, respectively. The form-closure connecting elements 90d, 92d are each realized as connecting studs. The form-closure connecting elements 90d, 92d in this case are each formed on to the tensioning element 44d and on to the further tensioning element 48d, respectively, by means of a stamping process. The cutting-strand holding element 18d and the further cutting-strand holding element 58d each respectively comprise a form-closure recess 94d, 96d, in which the respective form-closure connecting element 90d, 92d engages when the cutting-strand holding element 18d or the further cutting-strand holding element 58d has been connected to the cutting-strand holding element 18d or to the further cutting-strand holding element 58d. In this case, the form-closure recesses 94d, 96d are realized as oblong holes. This renders possible a longitudinal movement capability, between the cutting-strand holding element 18d or the further cutting-strand holding element 58d and the tensioning element 44d or the further tensioning element 48d, along a longitudinal axis of the guide unit 14d, for the purpose of equalizing play and/or tolerance of the cutting strand 12d and/or tensioning the cutting strand 12d. It is conceivable in this case that, in order to secure against the cutting-strand holding element 18d or the further cutting-strand holding element 58d being removed from the tensioning element 44d or from the further tensioning element 48d, the respective form-closure connecting element 90d, 92d, after being inserted in the respective form-closure recess 94d, 96d, is stamped, by means of a stamping process, in a partial region of the respective form-closure connecting element 90d, 92d projecting out of the form-closure recess 94d, 96d.

Furthermore, the tensioning element 44d and the further tensioning element 48d each comprise at least one positioning element 98d, 100d, for positioning the cutting-strand holding element 18d and the further cutting-strand holding element 58d, respectively, along at least one direction, relative to the tensioning element 44d and the further tensioning element 48d, respectively. The positioning elements 98d, 100d are each realized as positioning studs, which bear against an outer face of the cutting-strand holding element 18d or of the further cutting-strand holding element 58d for the purpose of positioning the cutting-strand holding element 18d or the further cutting-strand holding element 58d. However, it is also conceivable that, for the purpose of positioning the cutting-strand holding element 18d or the further cutting-strand holding element 58d, the positioning elements 98d, 100d engage in a recess of the cutting-strand holding element 18d or of the further cutting-strand holding element 58d, respectively. The positioning elements 98d, 100d are each respectively formed on to the cutting-strand holding element 18d and the further cutting-strand holding element 58d by means of a stamping process. In total, the tensioning element 44d and the further tensioning element 48d each have at least two positioning elements 98d, 100d, 102d, 104d. In this case, the two positioning elements 98d, 100d, 102d, 104d, as viewed along the longitudinal axis of the guide unit 14d, are in each case disposed with a lateral offset in relation to the form-closure connecting element 90d, 92d on the tensioning element 44d and on the further tensioning element 48d, respectively. Thus, when the cutting-strand holding element 18d and the further cutting-strand holding element 58d, and the tensioning element 44d and the further tensioning element 48d, have been connected to each other, the positioning elements 98d, 100d, 102d, 104d secure the cutting-strand holding element 18d and the further cutting-strand holding element 58d against rotation relative to the tensioning element 44d and the further tensioning element 48d, respectively.

In addition, the tensioning element 44d and the further tensioning element 48d each have at least one connecting element 106d, 108d, for form-closed connection to the guide unit 14d. The connecting elements 106d, 108d are each realized as connecting studs. The connecting elements 106d, 108d in this case are each respectively formed on to the tensioning element 44d and the further tensioning element 48d, respectively, by means of a stamping process. In total, the tensioning element 44d and the further tensioning element 48d each have at least two connecting elements 106d, 108d, 110d, 112d. When the tensioning element 44d and the further tensioning element 48d are disposed on the guide unit 14d, the connecting elements 106d, 108d, 110d, 112d engage in bearing recesses 20d, 114d of the guide unit 14d. The bearing recesses 20d, 114d are each realized as an oblong hole.

For the purpose of compensating play and/or tolerance of the cutting strand 12d and/or tensioning the cutting strand 12d, the power-tool parting device 10d is coupled to a pretensioning device (not represented in greater detail here) of power tool system that comprises the power-tool parting device 10d and a portable power tool (not represented in greater detail here). In this case, the drive element (not represented in greater detail here) of the pretensioning device engages in the cutting strand 12d. The cutting-strand tensioning unit 16d is moved relative to the guide unit 14d by means of an adjusting element (not represented in greater detail here) of the pretensioning device that engages in at least one adjusting recess 84d of the cutting-strand tensioning unit 16d. A tension of the cutting strand 12d is thus altered for the purpose of compensating play and/or tolerance of the cutting strand 12d in the guide unit 14d. The cutting-strand tensioning unit 16d is then fixed to the guide unit 14d, by a process of welding and/or stamping at least one of the connecting elements 106d, 108d, 110d, 112d, by means of fixing unit of the pretensioning device that is not represented in greater detail here. After the power-tool parting device 10d has been removed from and/or out of the pretensioning device, the cutting strand 12d is to a large extent prevented from falling fully into a coupling recess 70d of the cutting-strand tensioning unit 16d, by means of the cutting-strand holding elements 18d.

Furthermore, the cutting strand 12d has a multiplicity of cutting strand segments 116d, which each have at least one cut-depth limiting element 120d, disposed on a cutter carrier element 118d of the respective cutting strand segment 116d, for the purpose of limiting a maximum depth of cut of a cutting element 122d disposed on the cutter carrier element 118d of the respective cutting strand segment 116d (FIG. 7). Each of the cutting strand segments 116d thus comprises at least one cutter carrier element 118d, at least one cutting element 122d disposed on the cutter carrier element 118d, and at least one cut-depth limiting element 120d, disposed on the cutter carrier element 118d, for limiting a maximum depth of cut of the cutting element 122d. Each of the cutting strand segments 116d in this case has a maximum volume of less than 20 mm³. The cut-depth limiting element 120d limits a maximum depth of cut of the cutting element 122d to a value of less than 0.5 mm. The maximum depth of cut of the cutting element 122d is determined by a distance between a top side of the cut-depth limiting element 120d and a cutting edge of the cutting element 122d, as viewed along a direction extending, in a cutting plane of the cutting element 122d, at least substantially perpendicularly in relation to a cutting direction 40d of the cutting element 122d.

The cut-depth limiting element 120d, as viewed along the cutting direction 40d of the cutting element 122d, is disposed behind the cutting element 122d, on the cutter carrier element 118d. Thus, a chip space of the respective cutting strand segment 116d is formed, as viewed along the cutting direction 40d of the cutting element 122d. The cut-depth limiting element 120d in this case is realized so as to be integral with the cutter carrier element 118d. All of the cutting strand segments 116d of the cutting strand 12d have a respective cut-depth limiting element 120d. However, it is also conceivable that not every cutting strand segment 116d of the cutting strand 12d has a cut-depth limiting element 120d, and that the cutting strand segments 116d are combined with each other in various arrangements, with and without a cut-depth limiting element 120d, to form the cutting strand 12d.

Figure 9:
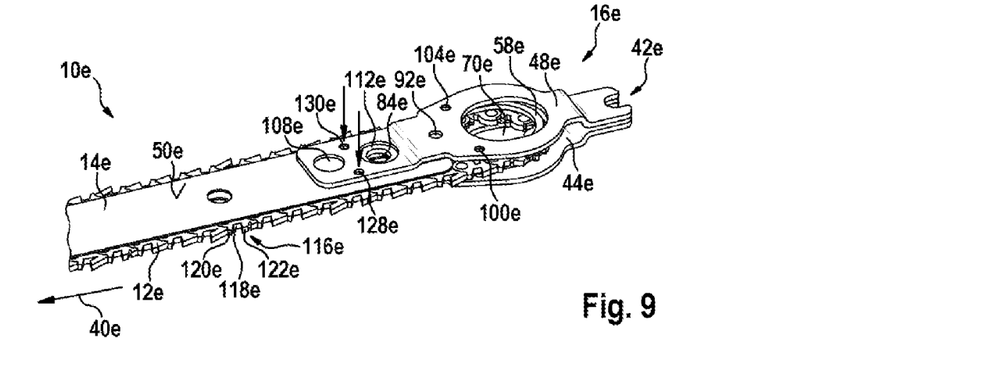

FIG. 9 shows a further, alternative power-tool parting device 10e, which comprises at least one cutting strand 12e, and at least one guide unit 14e for guiding the cutting strand 12e. The guide unit 14e in combination with the cutting strand 12e forms a closed system. The power-tool parting device 10e also comprises at least one cutting-strand tensioning unit 16e, which is disposed on the guide unit 14e and which is provided to compensate play and/or tolerance of the cutting strand 12e. The cutting-strand tensioning unit 16e comprises at least one cutting-strand holding element 18e, which is provided to hold the cutting strand 12e in at least one coupling position. The cutting-strand holding element 18e is realized in the shape of a disk. The cutting-strand tensioning unit 16e additionally has a further cutting-strand holding element 58e, which is similar in design to the cutting-strand holding element 18e. The cutting-strand holding element 18e and the further cutting-strand holding element 58e, as viewed along a direction that is at least substantially perpendicular to an outer face 46e of the guide unit 14e and to a further outer face 50e of the guide unit 14e, are disposed between a tensioning element 44e of the cutting-strand tensioning unit 16e and a further tensioning element 48e of the cutting-strand tensioning unit 16e (FIG. 9).

Figure 10:
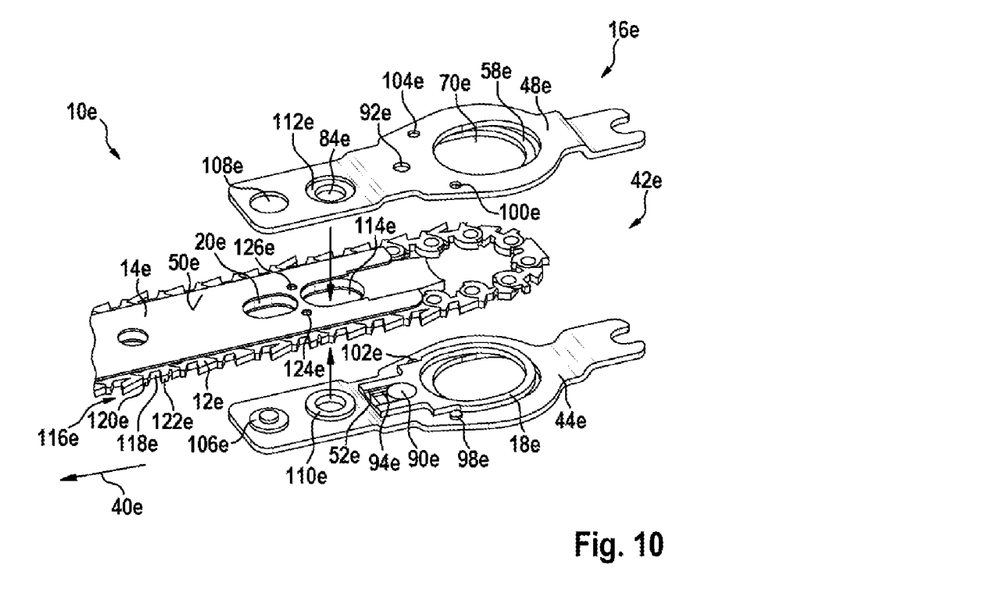

The power-tool parting device 10e from FIGS. 9 and 10 is of a design that is at least substantially similar to that of the power-tool parting device 10d from FIGS. 7 and 8. The difference between the power-tool parting device 10e from FIGS. 9 and 10 and the power-tool parting device 10d from FIGS. 7 and 8 consists in that, following compensation of play and/or tolerance of the cutting strand 12e, and/or following tensioning of the cutting strand 12e, the tensioning element 44e and the further tensioning element 48e are tensioned by means of a pretensioning device. In this case, the guide unit 14e, in addition to having bearing recesses 20e, 114e for receiving connecting elements 106e, 108e, 110e, 112e of the tensioning element 44e and the further tensioning element 48e, has two securing recesses 124e, 126e (FIG. 10). It is also conceivable, however, for the guide unit 14e to have a number of securing recesses 124e, 126e other than two.

After compensation of play and/or tolerance of the cutting strand 12e and/or tensioning of the cutting strand 12e has been effected by means of the pretensioning device, the cutting-strand tensioning unit 16e is then fixed to the guide unit 14e, by means of a fixing unit of the pretensioning device that is not represented in greater detail here, by a process of stamping at least one of the connecting elements 106e, 108e, 110e, 112e and, additionally, by a process of stamping two stamped extensions 128e, 130e (only the stamped extensions 128e, 130e of the further tensioning element 48e are represented in FIG. 9) on to the tensioning element 44e and on to the further tensioning element 48e, respectively. The stamped extensions 128e, 130e in this case engage in the securing recesses 124e, 126e for the purpose of fixing the tensioning element 44e and the further tensioning element 48e, respectively, to the guide unit 14e. To enable the stamped extensions 128e, 130e to engage in the securing recesses 124e, 126e following compensation of play and/or tolerance of the cutting strand 12e, and/or following tensioning of the cutting strand 12e, it is ensured that a stamping punch of the fixing unit is always disposed over the securing recesses 124e, 126e during a tensioning operation of the pretensioning device. In this case, in the case of a relative movement of the guide unit 14e relative to the cutting-strand tensioning unit 16e, the stamping punch is always moved together with the guide unit 14e. After the power-tool parting device 10e has been removed from and/or out of the pretensioning device, the cutting strand 12e is to a large extent prevented from falling fully into a coupling recess 70e of the cutting-strand tensioning unit 16e, by means of the cutting-strand holding elements 18e.

The invention claimed is:

1. A power-tool parting device comprising:
   at least one cutting strand;
   at least one guide unit configured to guide the cutting strand and, in combination with the cutting strand, forms a closed system;
   a transverse extension disposed in a fixed position on the at least one guide unit and defining an opening; and
   at least one cutting-strand tensioning unit positioned on the guide unit and configured to compensate at least one of play and tolerance of the cutting strand,
   wherein the cutting-strand tensioning unit includes at least one cutting-strand holding element configured to hold the cutting strand in at least one coupling position and at least one adjusting element extending through the opening in the transverse extension and configured to set at least one position of the cutting-strand holding element relative to the guide unit.

2. The power-tool parting device as claimed in claim 1, wherein the cutting-strand holding element has a substantially disk-like shape.

3. The power-tool parting device as claimed in claim 2, wherein the cutting-strand tensioning unit is movably mounted on the guide unit.

4. The power-tool parting device as claimed in claim 3, wherein:
   the guide unit has at least one bearing recess; and
   either at least one bearing element of the cutting-strand tensioning unit or a connecting element is configured to engage the at least one bearing recess.

5. The power-tool parting device as claimed in claim 4, wherein the bearing recess is an oblong hole.

6. The power-tool parting device as claimed in claim 1, further comprising at least one torque transmission element, which is translationally movably mounted relative to the guide unit, via the cutting-strand tensioning unit.

7. The power-tool parting device as claimed in claim 1, wherein:
   the opening in the transverse extension is a first opening located on a first side of the at least one guide unit,
   the at least one adjusting element is a first adjusting element extending through the first opening, and
   the cutting-strand tensioning unit further includes a second adjusting element extending through a second opening of the transverse extension located on an opposite second side of the at least one guide unit.

8. The power-tool parting device as claimed in claim 1, further comprising:
   a threaded element disposed in a fixed position on the transverse extension,
   wherein the at least one adjusting element is threadingly engaged with the threaded element.

9. A portable power tool comprising a coupling device configured to at least one of form-closed and force-closed couple to a power-tool parting device that includes:
   at least one cutting strand;
   at least one guide configured to guide the cutting strand and, in combination with the cutting strand, forms a closed system;
   a transverse extension disposed in a fixed position on the at least one guide unit and defining an opening; and
   at least one cutting-strand tensioning unit positioned on the guide unit and configured to compensate at least one of play and tolerance of the cutting strand,
   wherein the cutting-strand tensioning unit includes at least one cutting-strand holding element configured to hold the cutting strand in at least one coupling position and at least one adjusting element extending through the opening in the transverse extension and configured to set at least one position of the cutting-strand holding element relative to the guide unit.

10. The portable power tool as claimed in claim 9, wherein:
    the opening in the transverse extension is a first opening located on a first side of the at least one guide unit,
    the at least one adjusting element is a first adjusting element extending through the first opening, and
    the cutting-strand tensioning unit further includes a second adjusting element extending through a second opening of the transverse extension located on an opposite second side of the at least one guide unit.

11. The portable power tool as claimed in claim 9, wherein:
    the power-tool parting device includes a threaded element disposed in a fixed position on the transverse extension, and
    the at least one adjusting element is threadingly engaged with the threaded element.

12. A power tool system, comprising:
    a power-tool parting device that includes:
       at least one cutting strand;
       at least one guide configured to guide the cutting strand and, in combination with the cutting strand, forms a closed system;
       a transverse extension disposed in a fixed position on the at least one guide unit and defining an opening; and
       at least one cutting-strand tensioning unit positioned on the guide unit and configured to compensate at least one of play and tolerance of the cutting strand; and
    a portable power tool that includes a coupling device configured to at least one of form-closed and force-closed couple to the power-tool parting device,
    wherein the cutting-strand tensioning unit includes at least one cutting-strand holding element configured to hold the cutting strand in at least one coupling position and at least one adjusting element extending through the opening in the transverse extension and configured to set at least one position of the cutting-strand holding element relative to the guide unit.

13. The power tool system of claim 12, wherein:
    the opening in the transverse extension is a first opening located on a first side of the at least one guide unit,
    the at least one adjusting element is a first adjusting element extending through the first opening, and
    the cutting-strand tensioning unit further includes a second adjusting element extending through a second opening of the transverse extension located on an opposite second side of the at least one guide unit.

14. The power tool system of claim 12, wherein:
    the power-tool parting device includes a threaded element disposed in a fixed position on the transverse extension, and the at least one adjusting element is threadingly engaged with the threaded element.

* * * * *